United States Patent Office 3,318,556
Patented May 9, 1967

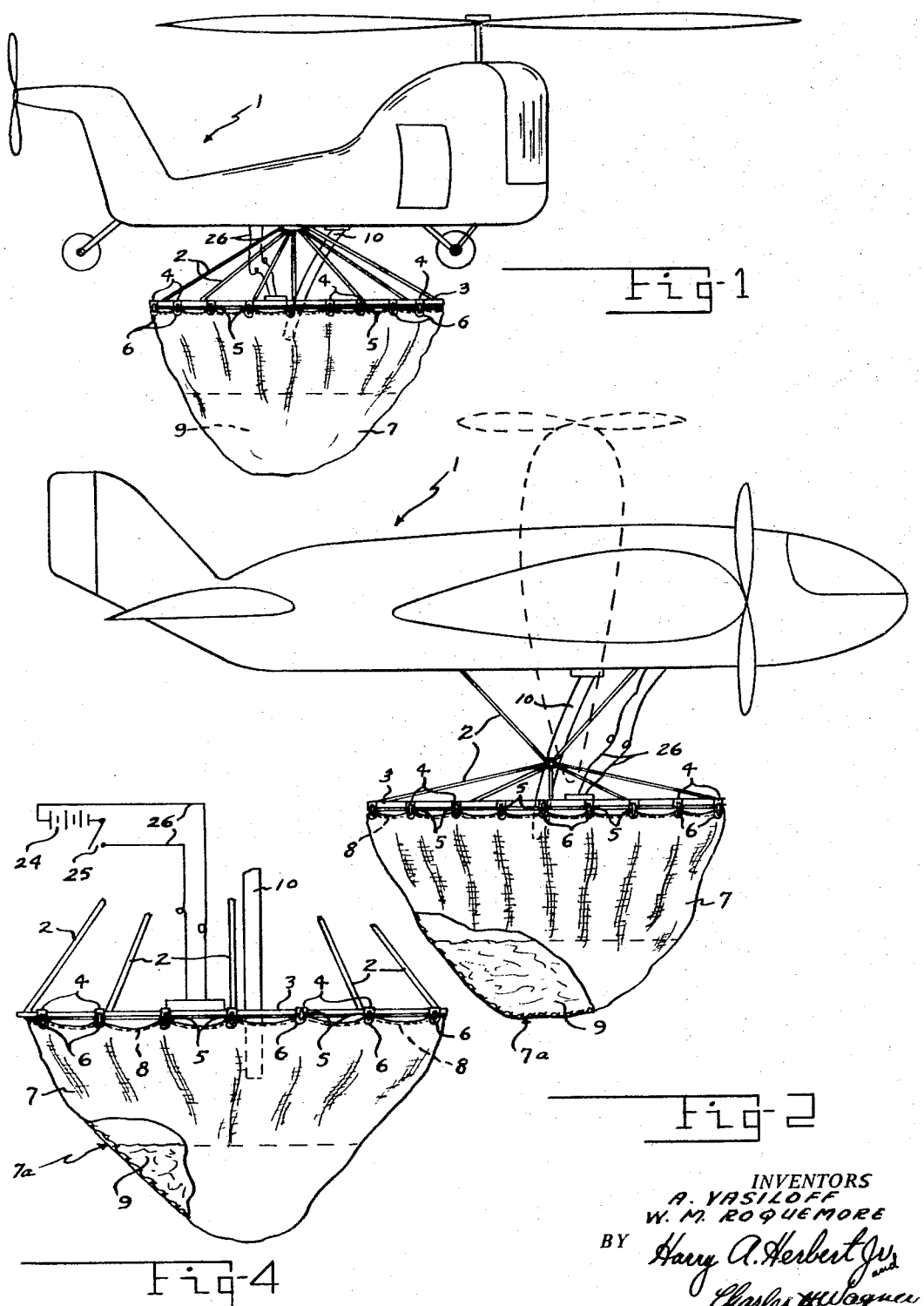

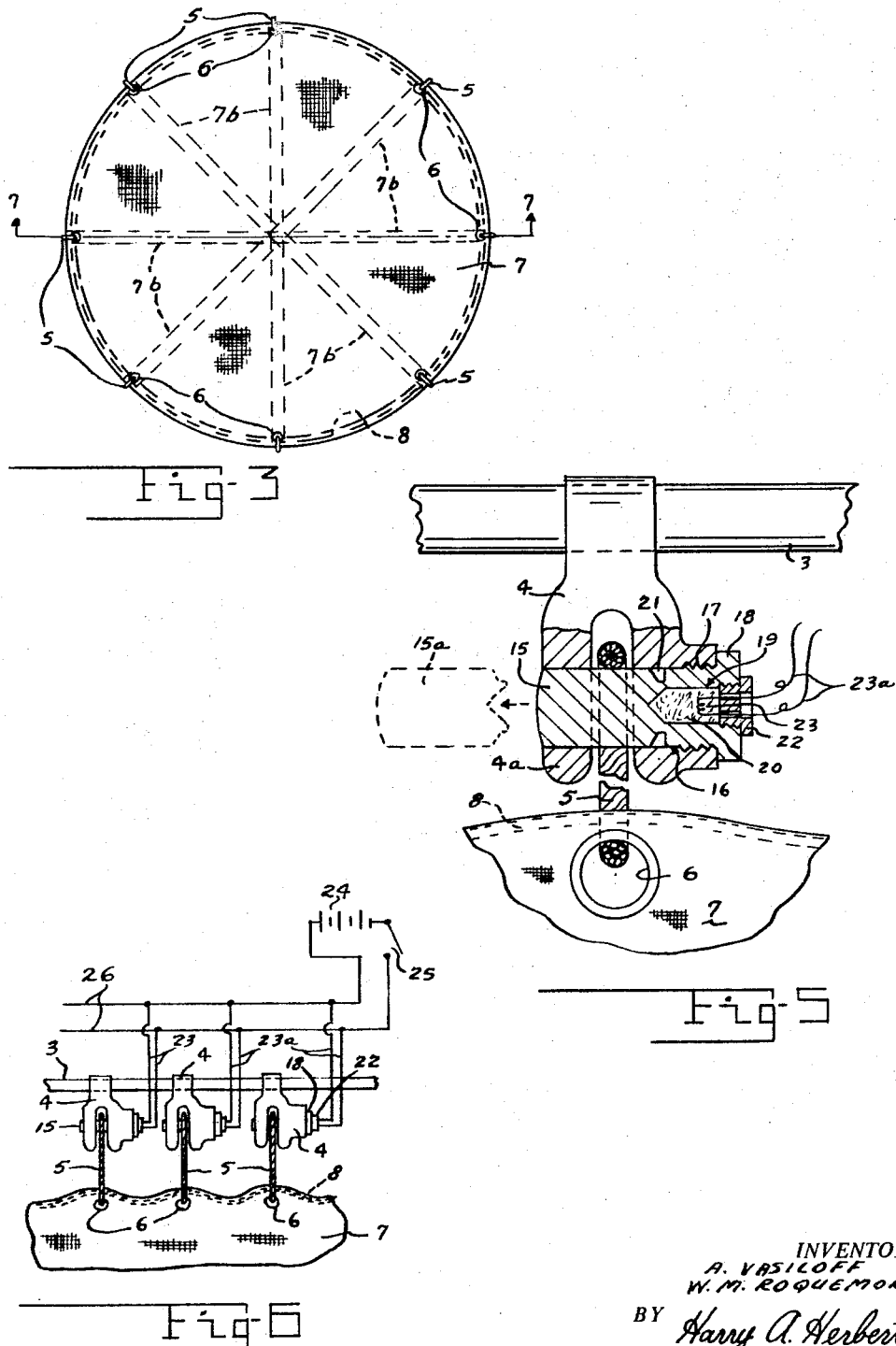

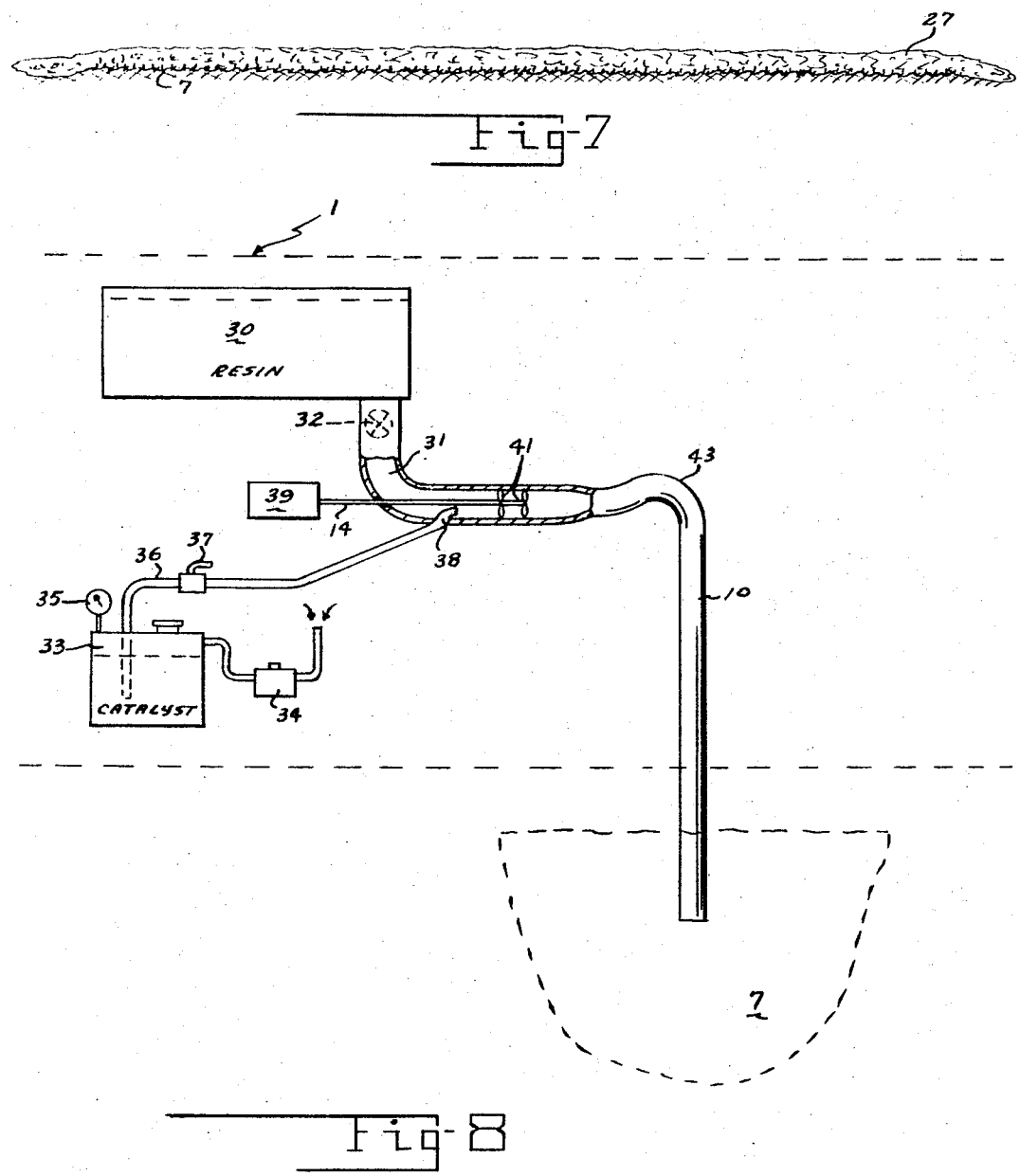

3,318,556
VTOL AIRCRAFT LANDING SITE
FABRICATION
Angelos Vasiloff and William M. Roquemore, both of Dayton, Ohio, assignors to the United States of America as represented by the Secretary of the Air Force
Filed Feb. 8, 1966, Ser. No. 526,968
6 Claims. (Cl. 244—114)

The invention described herein may be manufactured and used by or for the United States Government for governmental purposes without the payment to us of any royalty thereon.

This invention relates to the fabrication of aircraft landing sites, more particularly for VTOL/VSTOL aircrafts, having for an object a method and means for preparing such landing sites from an aircraft in flight above the selected site locations.

A further object of the invention is a method of preparing a suitable cargo supporting, and landing and takeoff sites for vertical landing and takeoff aircrafts from an aircraft while in flight above the selected site locations.

A further object of the invention is a method for preparing a cargo or aircraft landing and takeoff site for vertical landing and takeoff aircrafts which comprises preparing a flat, substantially circular fabric or tough plastic sheet of the approximate size of the desired VTOL/VSTOL aircraft landing site and gathering the edges of the sheet together to form a large flexible fabric or plastic bag-like container and loading the interior of the bag-like container with a rapid hard setting plastic or semi-fluid resin compound in sufficient quantity to form a coating of predetermined thickness over the sheet when the sheet is spread out flat and releasably suspending the gathered edges of the periphery of the sheet forming the bag-like container to and below a vertical takeoff, landing, and hovering aircraft, flying the aircraft at a predetermined altitude above a selected, preferably level, landing site and releasing the container while above the site for a free gravity drop onto the site at a sufficient height to cause the self-hardening fluid material in the container to flow radially to spread the sheet over the selected site and cover the sheet with a predetermined layer of the self-hardening plastic fluid resin material originally contained in the bag so that rapid hardening thereof on the ground provides an upper hard aircraft or cargo landing pad of predetermined thickness which is reinforced underneath by the sheet which originally constituted the container.

A further object is a method and means for rapidly preparing a landing site for VTOL/VSTOL aircraft from the aircraft itself or a supporting type aircraft which comprises, forming a bag-like container from a flat fabric sheet adapted to spread out radially flat to the desired size of the landing site and filling the bag with a predetermined quantity of fast setting soft plastic cement-like quick hardening resin formulation while the aircraft is over the selected site area and releasing the bag from the aircraft for free gravity drop and impact onto the selected site to provide a radial splash and flow pattern of the plastic or resin formulation contents in the container causing it to spread and flatten out the bag, the cover the upper surface thereof to form an aircraft landing area with the self-hardening resin material covering the upper surface of the flattened or spread out bag material to form, when hardened, a reinforced vertical aircraft landing and takeoff site or area of predetermined thickness, size and strength for VTOL/VSTOL aircraft landing and takeoff facilities.

A further object is the provision of means for constructing a VTOL/VSTOL aircraft and cargo landing site from the air above a selected site which comprises fabricating a suitable flexible fabric or tough flat plastic sheet having a diameter and area substantially equal to the diameter and area of the desired landing site, releasably suspending the sheet from its periphery below a hovering VTOL aircraft to form a suspended bag-like container below the aircraft, disposing a quick-setting fluid resin compound in the suspended container in sufficient quantity to radially spread and cover the inner surface of the bag to a predetermined thickness when the bag is dropped and contacts a selected landing site when released at a predetermined height above the selected site, and includes means for introducing a catalyst hardening agent with the resin formulation into the container prior to release of the container from its supporting aircraft to accelerate the hardening thereof after it hits and spreads over the surface of the selected site.

A further object includes the provision of means suspended below the site determining aircraft for releasably connecting the flat fabric sheet for containing the resin compound at a plurality of spaced connections around its periphery and means for simultaneously releasing all of said connections for dropping the sheet forming the container and its contents vertically for free gravity fall and contact with the surface of a selected landing site.

A further object includes a circular or annular supporting ring-like member carried by the aircraft having a plurality of circumferentially spaced releasable connections between the ring-like member and the periphery of the sheet with means for simultaneously releasing all of said connections to detach the gathered periphery of the flat fabric sheet from the ring-like member for free fall onto a selected aircraft or cargo landing site.

A further object includes means carried by the aircraft for conveying and discharging the resin formulation into the bag-like container while over or substantially over the selected site and thoroughly mixing a hardening catalyst with the resin formulation while it is discharged from the aircraft into the bag-like container.

Other objects and advantages of the invention will become apparent from the following description and accompanying drawings in which like reference characters refer to like parts in the several figures.

FIG. 1 is a somewhat schematic side elevation, showing the VTOL/VSTOL landing site formulation apparatus suspended below a vertical landing and takeoff aircraft, such as a helicopter in flight.

FIG. 2 is a similar view schematically showing the landing site forming apparatus attached to and supported below a VTOL/VSTOL type airplane.

FIG. 3 is a plan view of the circular flat fabric or plastic sheet which is employed to form a bag-like container, illustrating the supporting or sustaining loop connections which are spaced around its periphery.

FIG. 4 is a somewhat fragmentary side elevation of the device for carrying out the invention with the supporting aircraft omitted, showing the release circuitry.

FIG. 5 is a fragmentary partially sectional view illustrating one type of instant release connection between the anular supporting ring or hoop carried by the aircraft and includes the grommet connections around the periphery of the fabric container sheet.

FIG. 6 is a fragmentary detail view illustrating a circuit controlled release means which may be used to effect simultaneous release of all of the peripheral sustaining connections between the bag-like sheet container and the aircraft supported ring or hoop member.

FIG. 7 is a vertical sectional view taken about on the plane indicated by line 7—7 in FIG. 3, after the fabric sheet container has been dropped and its contents spread out by impact and hardened to form the desired landing pad area on the selected landing site.

FIG. 8 is a somewhat schematic view, partly in section, showing the apparatus carried by the landing site-forming aircraft for delivering the soft or fluid resin formulation into the bag-like container and thoroughly and quickly mixing the catalyst or hardening agent into the formulation as it is discharged into the container.

Referring to the drawings, and more particularly to FIGS. 1 and 2, the reference numeral 1 denotes a supporting aircraft, for instance of the hovering type such a helicopter (as seen in FIG. 1), or a VTOL/VSTOL airplane (as seen in FIG. 2) employed in carrying out the method, and with the means employed for effecting the construction or formation of an emergency landing area or site for VTOL/VSTOL aircraft.

Suitably suspended below the aircraft 1, for instance by cables or rigid supporting members 2, is an annular supporting ring or hoop member 3 which, as shown, is circular and preferably of strong tubular construction, although in some instances could be oval, or even somewhat rectangular in plan, depending somewhat upon the shape of the flat fabric sheet to be suspended and dropped on the selected landing site.

Suitably spaced around the ring or hoop member 3 are a plurality of shackle members 4 releasably connecting endless suspension loops 5 which extend through grummets 6 located in equally spaced relation around the periphery of the flat fabric or tough plastic sheet 7 which is to form the foundation layer for the landing site. The periphery of the sheet 7 may be reinforced by a bolt rope 8, and the upper surface is preferably prepared with a mass of outstanding threads or fibers (like the upper surface of a shaggy rug). There should preferably be the same number of grummets 6 and suspension loops 5 as the number of the release shackle supporting devices 4. The size and area of the sheet 7 (when laid out flat) is preferably about the same size and shape as the desired VTOL/VSTOL landing area, and therefore in much larger than the supporting ring or hoop member 8.

From the above it will be observed that when the fabric (or plastic) sheet 7 is secured in place on the hoop member 3, as seen in FIGS. 1, 2 and 4 the periphery is gathered in so that the sheet forms a tough flexible fabric (or plastic) bag-like container 7a adapted to be suspended and releasable for free gravity drop below the supporting aircraft 1.

The drop material, preferably any suitable quick curing fluid resin or soft plastic material 9 which forms the surface of the landing pad, is catalyzed as it flows into the flexible drop bag container sheet 7, being mixed with a suitable catalyst, for instance in the manner later described in connection with FIG. 8.

An example of a specific material which may be used comprises a base fire retardant polyester resin or a polyester resin with a special ablative modifier. The modified polyester resin having the following ablative additives: base polyester, 56%; granulated boric acid 32%; powdered antimony trioxide 5%; and methyl ethyl ketone peroxide 2%, which is used as a catalyst, at least 5% fiberglass reinforcement being utilized and can be incorporated in the drop bag. Other quick curing materials which might be utilized by the air drop concept besides the polyester resin are: epoxies, polyurethane foams, ceramic and other plastics, the catalyst being that material which when mixed with the resin or plastic drop material just prior to bag filling or during the bag filling operation causes the drop material to harden quickly, and there may be many different catalysts which can be utilized depending on the specific drop material. For example, methyl ethyl ketone peroxide (MEKP) or cumene hydroperoxide can be used for polyester resins.

The suitable quick setting resin or other semifluid hardening formulations or mixture 9 is quickly discharged into the bag-like sheet container 7 before release, preferably from a suitable container (and mixing) means within the supporting aircraft through a discharge tube or conduit 10, while the aircraft 1 is over or substantially over the selected landing site.

When the bag-like container 7–7a is released for free gravity drop and strikes the ground the impact causes a radial flow or spread of the fluid resin formulation to spread open and flatten the sheet-like container to its prefabricated flat shape and size and impregnating the shaggy fibers to form a foundation sheet over the selected landing area covered to a predetermined thickness by the spread of the quick-hardening resin formulation which upon hardening forms a hardened landing surface or pad 7b over the sheet 7 impregnated by the fibers on the sheet, somewhat as shown in FIG. 7, on which a VTOL or VSTOL aircraft can satisfactorily land (and take off) and on which cargo can be deposited, supported and stored, even on a soft, sticky, mushy or dry, soft, powdery surface or ground.

Means carried by the supporting aircraft 1 for discharging and mixing the fluid resin-catalyst formulation into the conduit 10 for discharge into the container may be employed somewhat like the apparatus shown in FIG. 8 in which a container or tank 30 for the fluid resin compound (without the catalyst) is carried within or by the supporting aircraft or helicopter 1 having a large conduit 31 leading therefrom into the discharge conduit 10 for emptying into the container 7, preferably with a control valve 32.

Also carried on or within the aircraft 1 is a catalyst supply tank 33 with means 34 to pressurize the tank 33 and a suitable pressure gage 35. A catalyst delivery conduit 36 leads from the tank 33 through a suitable control valve 37 into the main conduit 31 having a jet or opening at 38 in the conduit 31 extending downstream and somewhat centrally. A motor 39 is provided having a shaft 40 which extends centrally in the conduit 31 beyond the catalyst inlet 38 having one or more impeller fans or blades 41 thereon in front of the catalyst opening 38 for mixing the catalyst with the resin formulation and discharging or propelling the resin-catalyst mixture through the conduit 31 and out of the conduit 10 downwardly into the bag-like container 7, suitable mixing and accelerating baffles 42 being provided to effect a thorough mixing and acceleration of the flow of the resin compound and catalyst as it is forced over the upturned bend 43 and downwardly into the discharge conduit 10, the rise 43 forming a head in the conduit 31 above the level of the impeller blades 41. Other resin materials and catalysts may be employed if desired, for instance, as set forth in the U.S. Patent 3,025,159, dated Mar. 13, 1962, to Brouillette, Foley and McKennis, Jr., also the flexible drop bag-like sheet may contain nylon or fiber glass drop threads or an open mesh matting which is used to reinforce the drop material so that it can diffuse into the pores of the shaggy surface before hardening, so that as the drop material hardens the nylon or fiber glass threads will act as a reinforcing agent to give the drop material additional strength to support the weight of the VTOL aircraft or deposited stores or cargo, as well as resist the downward wash or blast of helicopters and other VTOL airplanes.

The drop bag or sheet may be constructed from nylon, vinyl, plastic or rubber coated fabric and, as mentioned, is usually circular in shape.

It is contemplated that any suitable quick setting cement or compound may be employed if desired, one of the important elements of the invention being that the self-hardening contents of the bag-like container upon contact with the ground will be of sufficient fluidity to spread out radially to spread the bag out flat on the selected landing contact surface and cover the surface of the spread out bag to a suitable predetermined thickness when it hardens so as to form a satisfactory hard durable emergency landing or storage and take-off surface or pad for VTOL and VSTOL aircrafts.

While any suitable type of quick release means for simultaneously releasing all of the sustaining loop members 5 around the gathered periphery of the sheet 7 may be employed, one release shackle means is illustrated in FIGS. 5 and 6 in which an explosive bolt or pin release means is employed. The bifurcated ends 4a of the shackles 4 each receive an explosive bolt or pin 15 passing through the eyes 16 of the shackle having a threaded end 17 for securing the pin in the shackle with a hex head 18 for tightening. The pin 15 is concentrically recessed at 19 to receive a powder charge 20 and is weakened at 21 to provide a break point when the charge 20 is detonated.

An insulated plug 22 is screwed into the outer end of the recess 19 having an ignitor, or flash coil, or primer 23 with spaced electrical circuit wires 23a leading from it through the plug 22.

As shown, when the charge 20 is exploded the portion of the pin 15 located outwardly of the weakened portion 21 is projected out of the eyes 16, as indicated at 15a, to simultaneouly release and free the suspension loops 5 in the grummets 6 which are located around the periphery of the fabric or plastic sheet 7.

As seen in FIG. 6 a battery or suitable electrical source 24 may be provided, having a circuit closing switch 25 with circuit wires 23a connected in parallel to the circuit 26 from the battery 24. When the switch 25 is closed all of the charges 20 in all of the explosive pins are detonated simultaneously and all of the loops 5 will be released at the same time to cause a release and free gravity drop of the fabric sheet 7 containing the quick hardening semi-fluid landing site coating and forming compound 9.

The sheet forming the container may be reinforced by reinforcing strips incorporated into the bag for resin reinforcement, for instance, as shown in dotted lines at 7b in FIG. 3, also an open mesh fiber glass net-like sheet lining (not shown) may be secured to the upper surface of the sheet to be impregnated by the mixture during its spread over the sheet upon impact with the ground.

If desired, the bag 7a may be suspended directly from the supporting shackles with the pins 15.

In conclusion, when the supporting aircraft arrives over the selected site the fluid resin formulation and catalyst are mixed as they are quickly discharged through the pipe 10 into the suspended bag 7–7a. The bag is then released and drops free onto the selected site and its contents spreads the bag out flat and spreads and covers the top surface of the sheet, impregnating the shaggy fibers and quickly hardens in a very short time, possibly as short as 15 minutes, the impregnated fibers permitting some flexure without appreciable material cracking when VTOL/VSTOL aircraft, or cargo is landed thereon, also the hard landing surface prevents the blast of VTOL/VSTOL from disturbing or eroding the subsoil during landing and takeoff.

The supported formulation could amount to more than 2000 lbs. and the bag can be dropped at a low altitude, say 25 ft. or less. In some cases it may be possible to have the extended bag touch the ground and then be released, depending upon the fluidity of the mixture and the size or diameter of the desired landing pad.

Air cured materials systems can also be utilized instead of catalyst cured systems. Such an example would be liquid asphalt, cements, or other plastics which harden when the volatile solvent is evaporated. These air cured systems will probably not be as quick setting as catalyst cured systems.

For purposes of exemplification a particular embodiment of the invention has been shown and described to the best understanding thereof. However, it will be apparent that minor changes and modifications in the arrangement and construction of the parts thereof may be resorted to without departing from the true spirit and scope of the invention as defined in the accompanying claims.

We claim:

1. The method of preparing a site which comprises the steps of preparing a flat supporting sheet having size and shape similar to the site, suspending the sheet below a supporting aircraft to form a bag-like container, filling the container while substantially above the site with a soft self-hardening plastic formulation in sufficient quantity to cover the site to a predetermined substantially uniform thickness, releasing the bag-like container and contents at a substantially predetermined altitude above said site for free gravity fall and impact on the site to cause the contents to radially spread the bag out flat over the site and cover the surface of the spread out bag to said predetermined thickness, and permit the same to harden to form a self-hardened supporting surface.

2. The method of forming a VTOL/VSTOL aircraft and cargo landing site from a supporting aircraft in flight above said site which comprises fabricating a flat fabric supporting sheet, having a size and shape substantially equal to the size and shape of a desired site, gathering the periphery of said sheet together to form a bag-like container, releasably securing the periphery of said container below a supporting vertical takeoff and landing aircraft, conveying a sufficient quantity of self-hardening fluid resin formulation and catalyst hardening agent therefor separately in said supporting aircraft to a selected landing site, mixing and discharging said fluid resin and catalyst into said bag-like container while substantially over said selected site, releasing said bag-like container and contents at a substantially predetermined altitude above said site for free gravity drop onto said site, to cause radial flow of said fluid contents upon impact with said site to spread said bag-like container sheet out flat and cover the surface thereof to cause the contents therein to spread radially over the sheet to a substantially uniform predetermined thickness and quickly harden to form a hard landing area for VTOL/VSTOL aircraft and cargo.

3. An apparatus for rapidly forming an emergency landing site for VTOL/VSTOL aircraft from the aircraft itself or a supporting aircraft in flight above or substantially above a selected site comprising a flat circular flexible supporting fabric-like sheet having an area substantially equal to the area of the desired landing site, a plurality of suspending members connected in substantially equally spaced relation around the periphery of the sheet, an annular support member adapted to be suspended below a supporting VTOL/VSTOL aircraft enclosing an area materially smaller than the spread out flat area of said sheet, a plurality of releasable connectors equal in number to the aforesaid suspending members for releasably connecting said suspending members to said connectors to form a bag-like container from said sheet, suspended below said annular support member and adapted to receive and contain a predetermined quantity of self-hardening semifluid resin-like formulation sufficient to cover the surface of said sheet to a predetermined thickness when said sheet is spread out flat to form a self-hardening VTOL/VSTOL or cargo and storage landing pad, means for simultaneously releasing all of said suspending members while the bag-like container and contents is above a selected landing site for a free gravity drop onto said site, to cause said bag-like container to be spread out flat by radial flow and spread its contents upon impact with the surface of said selected site and cover said sheet to substantially said predetermined thickness and hardness, to form a hard surface said VTOL/VSTOL and cargo landing pad.

4. Apparatus as set forth in claim 3 including separate fluid resin formulation and catalyst quick hardening agent therefor adapted to be carried by said supporting aircraft, and means for mixing and discharging said resin formulation and catalyst into said bag-like container while substantially over said site prior to release thereof from said annular supporting means.

5. Apparatus for forming a VTOL/VSTOL aircraft and cargo landing area from an aircraft above a selected site comprising a supporting aircraft adapted to hover over the selected site, a tank-like container carried by the aircraft, a catalyst quick-hardened resin formulation contained in said tank in sufficient quantity to cover the site to substantially a predetermined thickness, a catalyst container carried by the aircraft, a sufficient quantity of catalyst hardening agent for said formulation carried by said container to form a quick-hardening agent for said resin formulation, conduit and mixing means carried by the aircraft for simultaneously mixing and discharging said resin formulation and said catalyst below said aircraft while substantially over and above a selected landing site, an annular rigid support fixed to and below said aircraft, a plurality of releasable supports spaced around the periphery of said annular support, a prefabricated flat fabric-like sheet having much greater area than said annular support and substantially equal in shape and area to the desired landing site, a plurality of suspension means spaced around the periphery of said sheet, each connected to one of said releasable supports to gather in the periphery of said sheet to form a bag-like container releasably suspended from said annular support member, a resin formulation and catalyst mixture discharge conduit carried by said aircraft for receiving said mixed resin formulation and catalyst from the aforesaid conduit and mixing means and discharging the same into said bag-like container, and means carried by said aircraft for simultantously releasing all of said release supports to release said bag-like container for free gravity drop at a desired altitude above a selected site, whereby upon impast said contents of said bag-like container sheet will spread said bag-like container sheet out flat to cover the selected area and spread and flow radially over said sheet to said approximate predetermined thickness and hardness, to form a hard surface landing pad for VTOL/VSTOL aircraft and cargo in which said pad will have an area and size approximating the size and area of said sheet.

6. Apparatus as set forth in claim 5 in which the inside surface of said bag-like container which forms the upper surface of said sheet when spread out flat includes loose thread-like fibers projecting therefrom adapted to be impregnated with the hardening fluid resin mixture to form reinforcing means therefor between the mixture and the sheet when spread and hardened on the selected landing area.

References Cited by the Examiner

UNITED STATES PATENTS 3,072,371   1/1963   Doyle _____ 244—137

MILTON BUCHLER, *Primary Examiner.*

P. E. SAUBERER, *Assistant Examiner.*